(12) United States Patent
Young

(10) Patent No.: US 6,398,300 B1
(45) Date of Patent: Jun. 4, 2002

(54) SEAT BACKREST MOUNTING

(75) Inventor: Martin Raymond Young, Ocean Grove (AU)

(73) Assignee: Henderson's Industries Pty. Ltd., South Melbourne (AU)

( * ) Notice: Subject to any disclaimer, the term of this patent is extended or adjusted under 35 U.S.C. 154(b) by 0 days.

(21) Appl. No.: 09/486,243
(22) PCT Filed: Aug. 26, 1998
(86) PCT No.: PCT/AU98/00686
§ 371 (c)(1),
(2), (4) Date: Aug. 8, 2000
(87) PCT Pub. No.: WO99/10196
PCT Pub. Date: Mar. 4, 1999

(30) Foreign Application Priority Data

Aug. 26, 1997 (AU) .............................................. PO8773

(51) Int. Cl.$^7$ ................................................. B60N 2/42
(52) U.S. Cl. ............................... 297/216.13; 297/452.18
(58) Field of Search ....................... 297/216.13, 216.14, 297/452.18, 216.1, 361.1

(56) References Cited

U.S. PATENT DOCUMENTS 5,219,202 A * 6/1993 Rink et al.
5,769,499 A * 6/1998 Dudash et al.
5,918,943 A * 7/1999 Mitschelen et al.

FOREIGN PATENT DOCUMENTS

| DE | A13303069 | 8/1984 |
| DE | A14020057 | 1/1992 |
| DE | A119603946 | 8/1997 |

* cited by examiner

Primary Examiner—Milton Nelson, Jr.
(74) Attorney, Agent, or Firm—Birch, Stewart, Kolasch & Birch, LLP

(57) ABSTRACT

A seat arrangement includes a backrest frame and a base frame with the backrest frame connectable, adjacent the lower extent of each of opposite sides thereof, to respective mounting that facilitate pivotable mounting of the backrest frame to the base frame. Each mounting includes a respective load dispersing member and the backrest frame is connected to the mounting by fasteners inserted laterally of the frame, through the frame and the load dispersing member of the mounting. The fasteners draw each load dispersing member into a respective recess defined by the backrest frame, with each recess having a form complementary to the load dispersing member to define respective base surfaces through which the fasteners extend, and opposing side surfaces. The fasteners, in fastening the backrest frame to the mounting, cause each load dispersing member to be clamped in the respective recess whereby respective adjacent side surfaces of the recess and the load dispersing member are urged into surface to surface contact.

21 Claims, 5 Drawing Sheets

SEAT BACKREST MOUNTING

This application is the national phase under 35 U.S.C. §371 of PCT International Application No. PCT/AU98/00686 which has an International filing date of Aug. 26, 1998, which designated the United States of America.

FIELD OF THE INVENTION

This invention relates to an improved arrangement for seats, such as motor vehicle seats, which have a backrest frame that is adjustable relative to a seat base via a seat recliner system.

BACKGROUND OF THE INVENTION

In seats of the above-indicated types, especially with those for automotive use, there has been a considerable effort in recent years to introduce weight-reducing improvements. One such improvement has seen the introduction of seat backrest frames cast from light alloys or molded from engineering plastics. These backrest frames are connected to the seat base via the seat recliner system. Accordingly, in order to achieve a connection which does not adversely impair the overall strength of the seat, it has been necessary to adopt a seat back connection of a form which substantially offsets the weight-reduction achieved by the backrest frame.

One form of connection for cast or molded backrest frames has utilized steel reinforcement beams, each of which extends up a respective side of the backrest frame. Another form utilizes a much heavier recliner system with bolting or riveting of vertical arms which similarly extend up the backrest frame to enable multiple fixings. In each case, the overall weight saving is less than achieved in the backrest frame, while there also are disadvantages in costs, materials usage and assembly time. Also, the connections can utilize space which otherwise would be available for other mechanisms, such as inflatable air-cushions and at least part of an operating mechanism for an adjustable lumbar support.

SUMMARY OF THE INVENTION

According to the present invention there is provided a seat arrangement including a backrest frame and a base frame. The backrest frame is connectable, adjacent the lower extent of each of opposite sides thereof, to respective mounting means that facilitate pivotable mounting of the backrest frame to the base frame. Each of the mounting means includes a respective load dispersing member, and the backrest frame is connected to the mounting means by fasteners inserted laterally to the frame, through the frame and the load dispersing member of the mounting means, the fasteners on fastening, drawing each load dispersing member into a respective recess defined by the backrest frame. Each recess has a complimentary form with the load dispersing member to define respective base surfaces through which the fasteners extend, and opposes side surfaces. The fasteners, upon fastening the backrest frame to the mounting means, causes each of the load dispersing members to clamp into the respective recess, whereby respective adjacent side surfaces of the recess and the load dispersing member are urged into a surface to surface contact.

The side surface of each load dispersing member and each of the recesses may be substantially parallel, although they preferably diverge.

In a preferred arrangement, each mounting means includes a mounting member, separately formed from the load dispersing member. The fasteners extend through the frame and the member and through the load dispersing member. In an alternative arrangement, the mounting member and the load dispersing member are formed as a single component, either integrally or by suitable connecting means, such that the fasteners extend through the frame and the load dispersing member.

The fasteners may comprise threaded screws or bolts. Alternatively, they may comprise rivets.

There preferably are two fasteners, with these most preferably spaced from each other in the front to rear direction relative to the backrest frame when the latter is in a normal in-use orientation. However, the fasteners can be spaced in other directions, for example, such as upwardly spaced.

Each load dispersing member preferably is formed of steel. In that case, it can be pressed or stamped from steel plate to provide a central region between two opposed diverging wing portions. The load dispersing member may be open between adjacent ends of the respective opposed wing portions, or it may be closed. In latter arrangement, the load dispersing member is somewhat cup-shaped. The central region may have holes formed therein for receiving the fasteners. In the case of threaded fasteners, the holes may be threaded. Alternatively, threaded nuts can be provided, with the nuts preferably welded to the central region. Alternatively, the central region can have burst holes for use with self-threading fasteners.

Rather than being formed from steel plate, each load dispersing member can be cast from a suitable metal such as a light alloy, preferably a high strength alloy, which might undergo suitable strengthening treatment during formation, such as heat treatment. The load dispersing member might additionally, or alternatively, be coated with a suitable strengthening coating. In these cases, the load dispersing member again may have a central region between two wing portions, with the wing portions preferably diverging. However, strengthening ribs preferably are provided between the wing portions. Alternatively, the load dispersing member may be of solid form, defining a central surface between two diverging side surfaces.

The recess defined by the backrest frame, at each of the opposite sides thereof, opens laterally. Also, each recess is defined by a wall portion of the frame which provides two side surfaces, preferably two mutually inclined diverging side surfaces, separated by a base surface through which the fasteners extend. The recess may be open at one or each end thereof, i.e., between the side surfaces. Alternatively, it may be closed at each end so as to enclose the load dispersing member around the periphery of the latter.

In one convenient arrangement, the load dispersing member is pressed from steel plate to provide a central region between two similarly diverging wing portions. In that arrangement, an included angle between each wing portion, and the central region is slightly in excess of a corresponding included angle between each side surface and the base surface of the respective recess. The arrangement is such that, as fasteners are applied to draw the load dispersing member into the recess to achieve surface to surface contact, the wing portions are caused to flex so that each is substantially parallel to a side surface of the recess. It is preferable that the wing portions are caused to flex only slightly, so that the level of strain induced in the load dispersing member when drawn into the recess is relatively low. The flex principally has the effect of reducing or eliminating free play between the load dispersing member and the backrest frame, so as to prevent movement therebetween under load, and to provide surface to surface contact between the side surfaces of the recess and the diverging wings of the load dispersing member for acceptable load transfer.

BRIEF DESCRIPTION OF THE DRAWINGS

In order that the invention may more readily be understood, description now is directed to the accompanying drawings, in which.

DETAILED DESCRIPTION OF THE PREFERRED EMBODIMENTS

Figure 1:
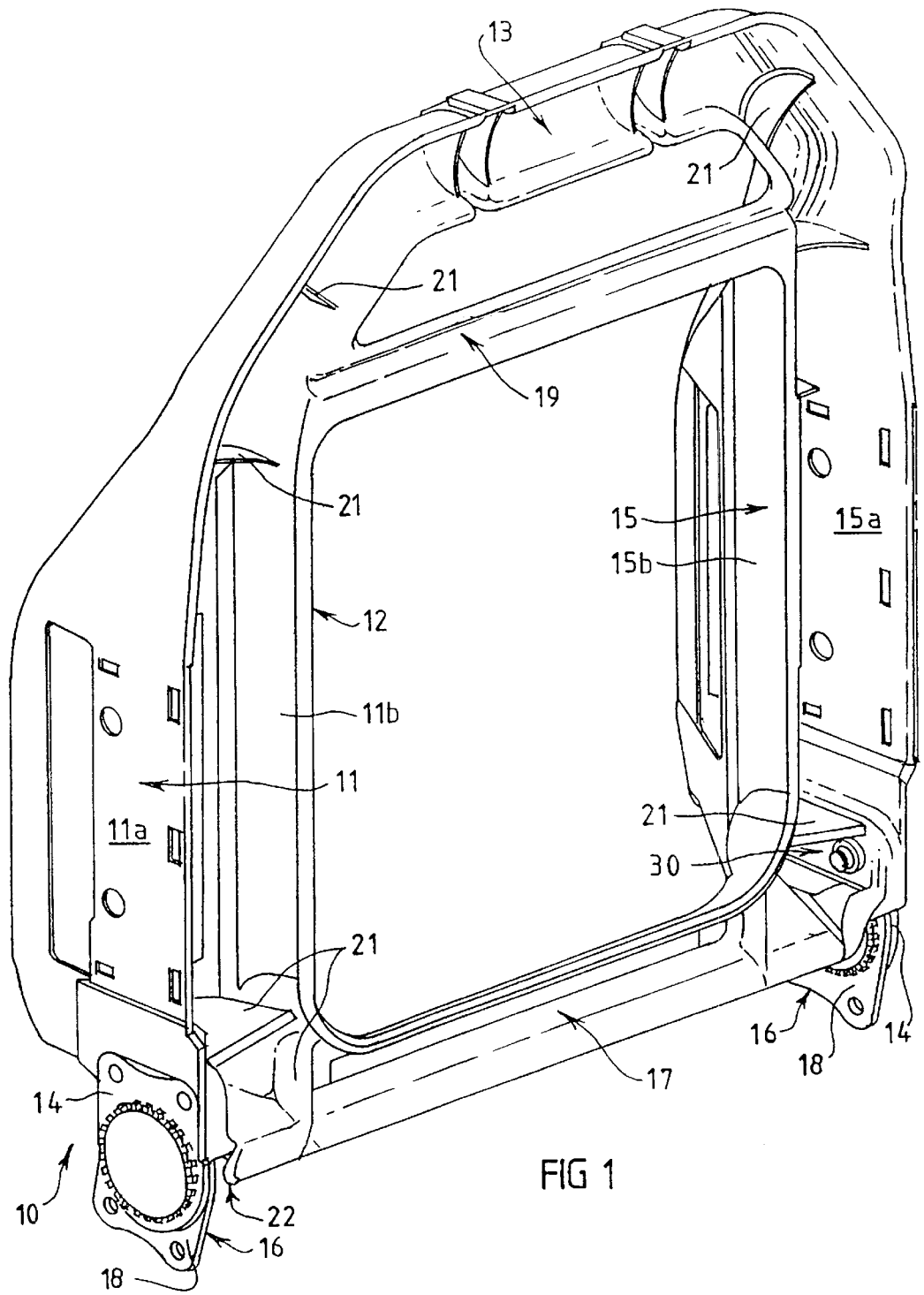
FIG. 1 is a rear perspective view of a vehicle seat backrest frame, shown connected to mounting members in an arrangement according to the present invention.

With reference to the drawings, the arrangement 10 as shown therein includes a vehicle seat backrest frame 12 which is connected, at the lower extent of each of opposite sides thereof, to a respective mounting member 14. Each member 14 forms part of a respective coupling 16 for a seat recliner system, with each coupling 16 also including a lower mounting member 18 which is connectable to a seat base frame (not shown).

The frame 12 corresponds substantially to that shown in the illustrated embodiment of our co-pending Australian provisional patent application PO 2747, filed on Oct. 4, 1996. In relation to the overall detail of the construction of frame 12, reference is made to PO 2747, the disclosure of which is incorporated herein by reference and to be read as part of the disclosure of the present invention.

The frame 12 is cast from a suitable light alloy, such as a magnesium alloy. Its overall form is somewhat rectangular. However, the peripheral frame members 11, 13, 15 and 17, and also its transverse member 19, are of rearwardly open channel form. Frame 12, in being of a light alloy, has a relatively low overall weight but a relatively high strength to weight ratio. The strength is further enhanced by transverse fins 21 provided between the opposed sides of members 11, 13, 15 and 17 with the opposed sides being designated 11a and 11b and 15a and 15b for members 11 and 15.

Figure 2:
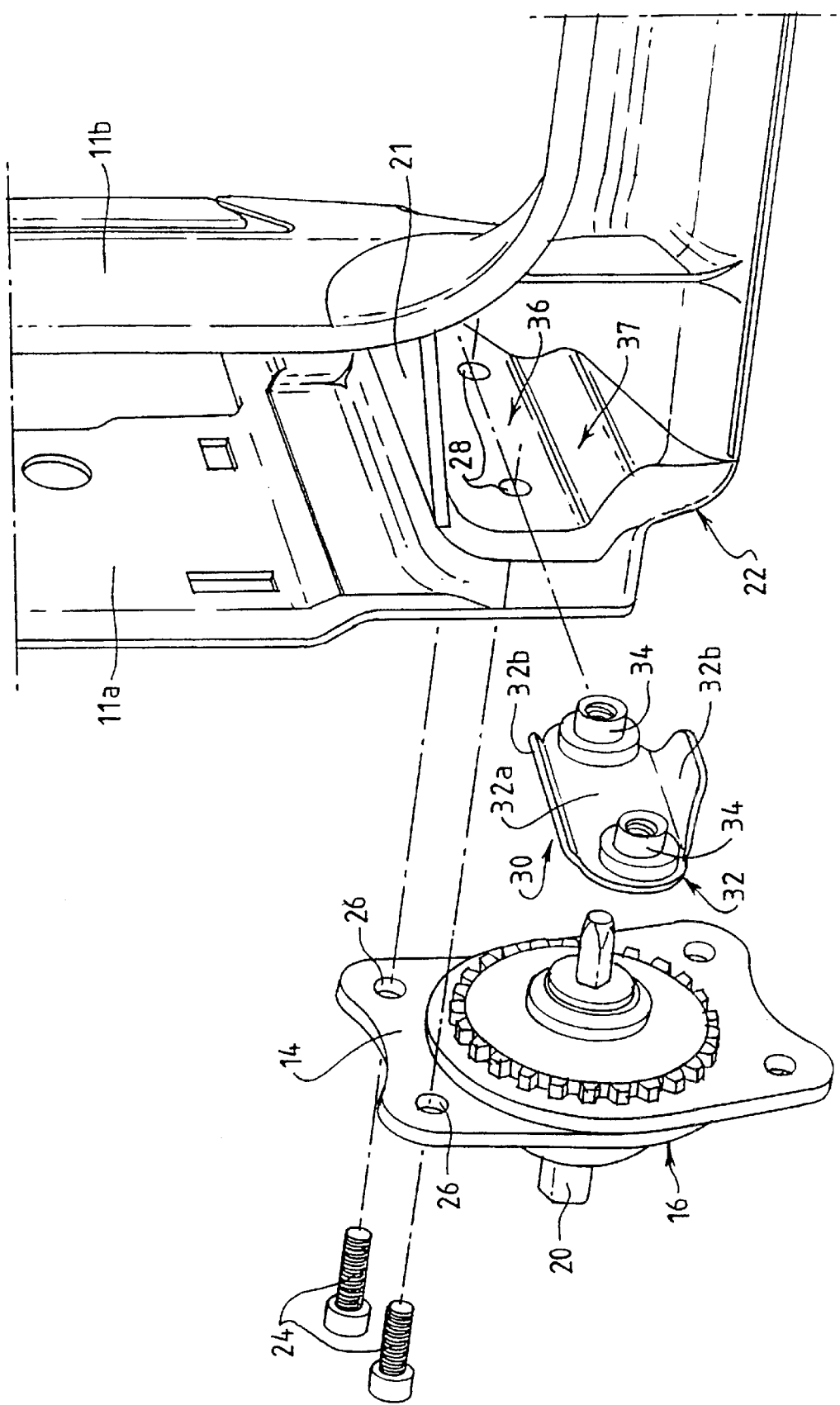
FIG. 2 is an exploded perspective view of the, arrangement of FIG. 1 for one of the mounting members.
Figure 3:
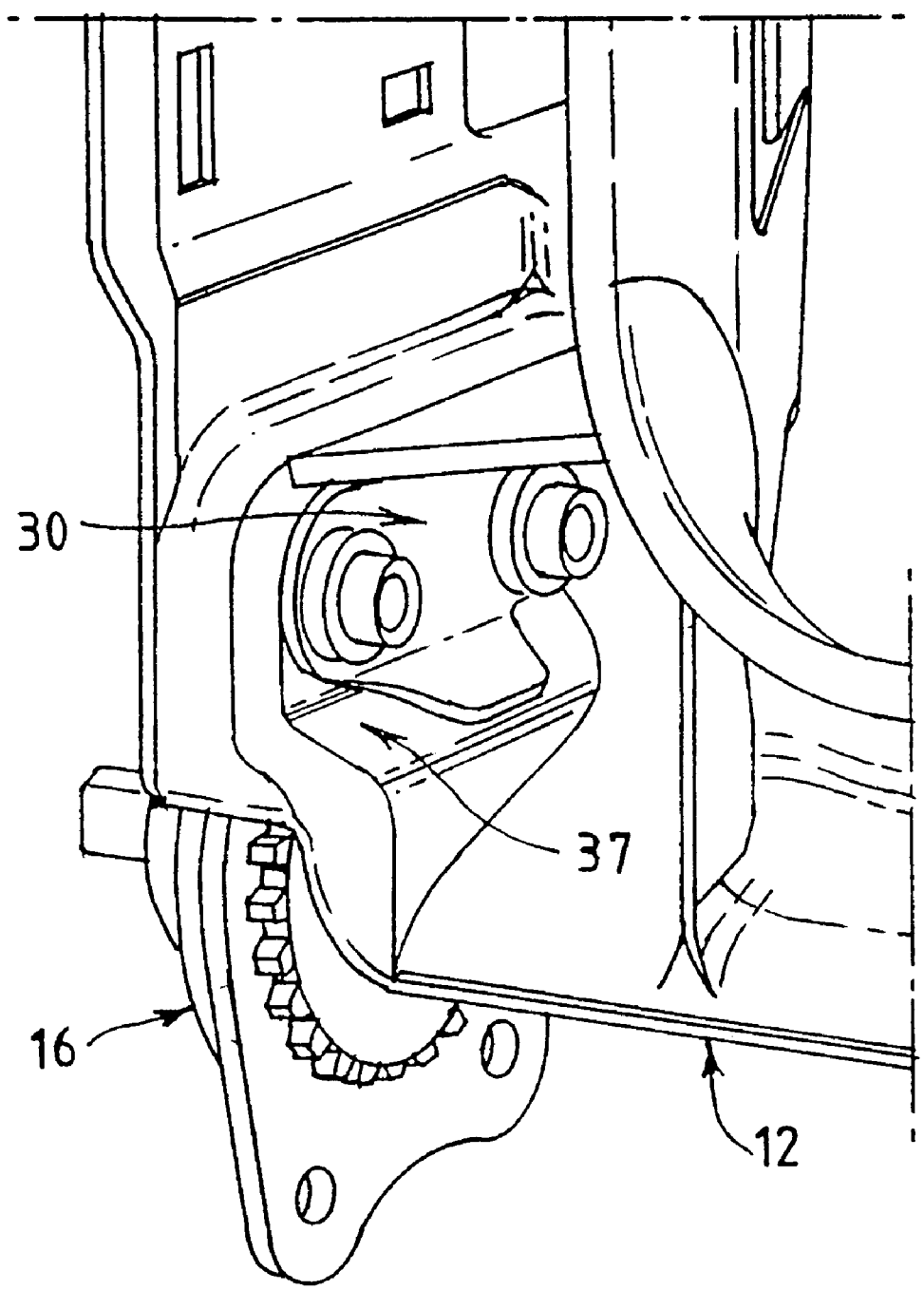
FIG. 3 corresponds to FIG. 2, but shows the arrangement as assembled.
Figure 4:
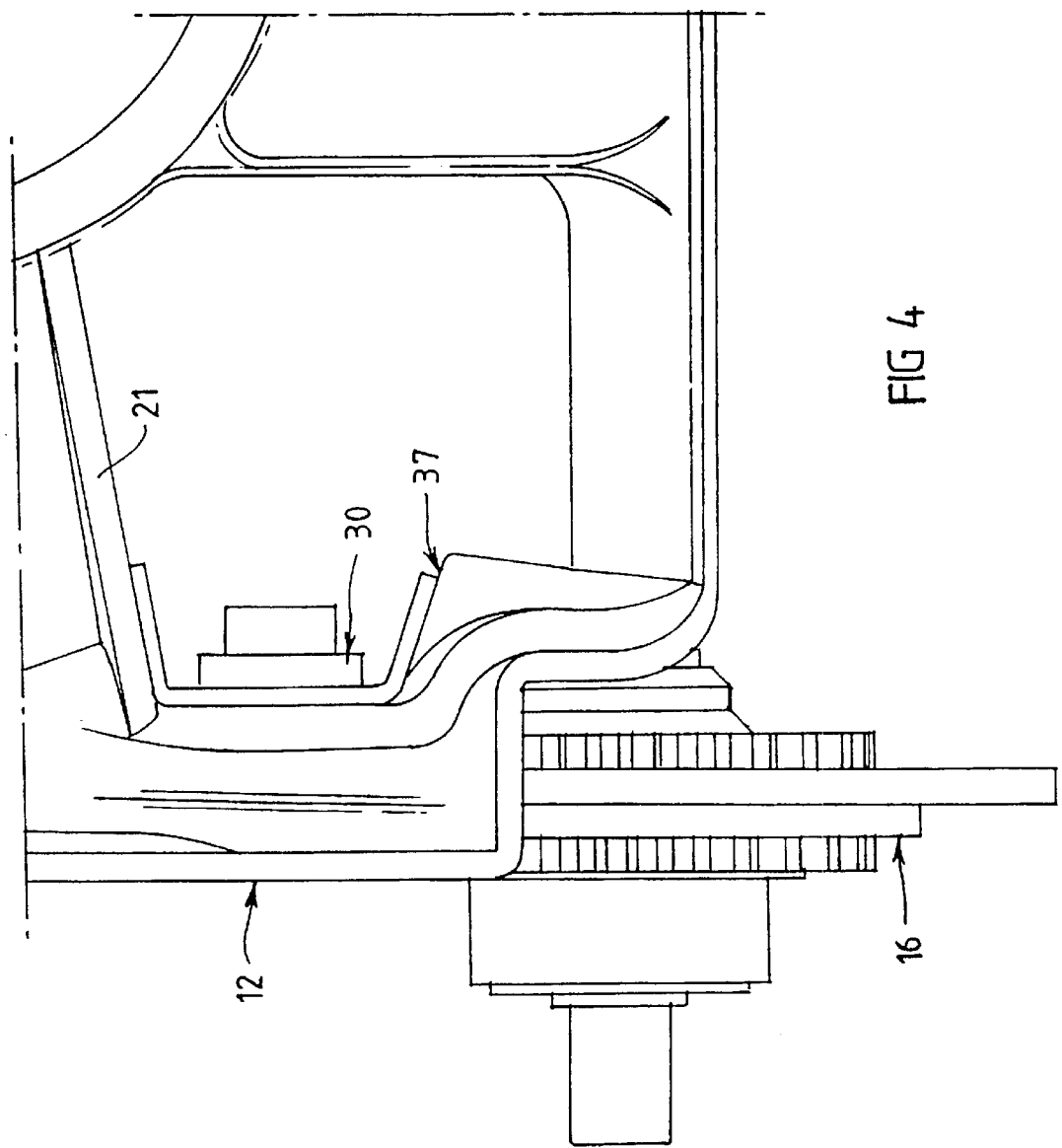
FIG. 4 is a rear elevation of the arrangement as shown in FIGS. 2 and 3.

Referring to FIG. 2, each coupling 16 further includes a shaft 20 which extends through overlapping portions of its members 14 and 18, and a mechanism by which members can be released for relative rotation on the axis of shaft 20 or held in a required angular relationship. The overall construction of the mechanism is not part of the present invention and it therefore need not be fully described herein. However, the respective couplings 16 may be interconnected (by means not shown) but, in any event, they function in unison to enable frame 12 to be adjusted, as required, in its inclination relative to a seat base to which it is connected. Also, the inter-connection between the couplings 16 extends below member 17 of frame 12. Thus, the upper extent of each member 14 is fastened against the lower extent of the respective one of members 11 and 15 of frame 12, with frame 12 being indented at 22 below such fastening whereby the upper extent of the respective member 18 and of a gear 23 on the inner face of each member 18 are accommodated with slight clearances. As shown, the indents 22 are in the outer wall 11 a and 15a of members 11 and 15.

Each member 14 and, hence, its coupling 16, is connected to a respective one of members 11 and 15 by means of two fasteners 24. Each fastener 24 extends through an aperture 26 in member 14 and an aligned aperture 28 in the respective one of members 11 and 15. However, as shown, fasteners 24 are used in combination with a device 30 which functions to disperse loadings transferred to or from frame 12 which otherwise would concentrate in the immediate vicinity of each fastener 24.

Each device 30 has a body 32 pressed from steel sheet of a suitable thickness, and two threaded nuts 34 welded to body 32. Each nut 34 provides a continuation of an aperture (not shown) through body 32; with the spacing between centres for nuts 34 corresponding to that for each of apertures 26 and each of apertures 28. Also, while not shown, fasteners 24 are threaded so as to threadably engage with nuts 34.

Body 32 of each device 30 is pressed so as to define a central region 32a at which nuts 34 are provided and, at each side of region 32a, a respective wing 32b. The wings 32b are bent at similar but opposite angles with respect to region 32a such that they diverge away from each other in a direction beyond nuts 34. Thus, over the surface of body 32 remote from nuts 34, as viewed from one end of region 32a (i.e., in the direction of spacing between nuts 34), device 30 has the form of a truncated wedge.

In connecting the members 14 by fasteners 24, each device 30 is drawn so as to locate firmly in a recess 36 defined within the respective one of members 11 and 15. The recess 36 is in the inner surface of the outer wall 11a and 15a of members 11 and 15. In the specific arrangement shown, each recess is defined in part by an abutment surface 37 resulting from the formation of each indent 22, and an adjacent fin 21. The surface 37 and the fin 21 are spaced from each other on opposite sides of apertures 28, while they also are oppositely inclined with respect to the respective one of sides 11a and 15a. The arrangement is such that each recess 36 is of substantially complementary form to the above-mentioned truncated wedge form of body 32 of its device 30. However, the included angle between each of surfaces 37 and fin 21 and the respective one of sides 11a and 15a is slightly less than the inclination of each wing 32b to region 32a of device 30. Thus, as device 30 is drawn into its recess 36 by tightening of fasteners 24, the wings 32b are caused to flex inwardly to achieve good surface to surface contact with fin 21 and surface 37.

The devices 30 result in good dispersal of loads transferred to or from backrest frame 12 via fasteners 24. That is, the loads are distributed over the area of surface to surface contact achieved by devices 30, rather than being concentrated at the immediate vicinity of fasteners 24. To further enhance the resultant load accommodating capacity of the connection of members 14 to frame 12, the wall thickness of frame 12 preferably is increased at each recess 36. Thus, the respective fin 21 which defines part of each recess 36 can be thickened, as shown, relative to the thickness sufficient for other fins 21. Also, the thickness of each of sides 11a and 15a, where forming part of recess 36 and defining a surface 37 can be of increased relative to the thickness that is sufficient in other parts of members 11 and 15.

The devices 30 can, if required, be cast or formed by powder metallurgy from light alloy, or molded from a suitable engineering plastics material, rather than formed from steel sheet. However, if not made from steel sheet, fins preferably are provided across the body 32a between wings 32b. Alternatively, the volume shown between wings 32b can be filled by metal or engineering plastics material, such that body 30 is solid, rather than provided with actual wings.

Figure 5:
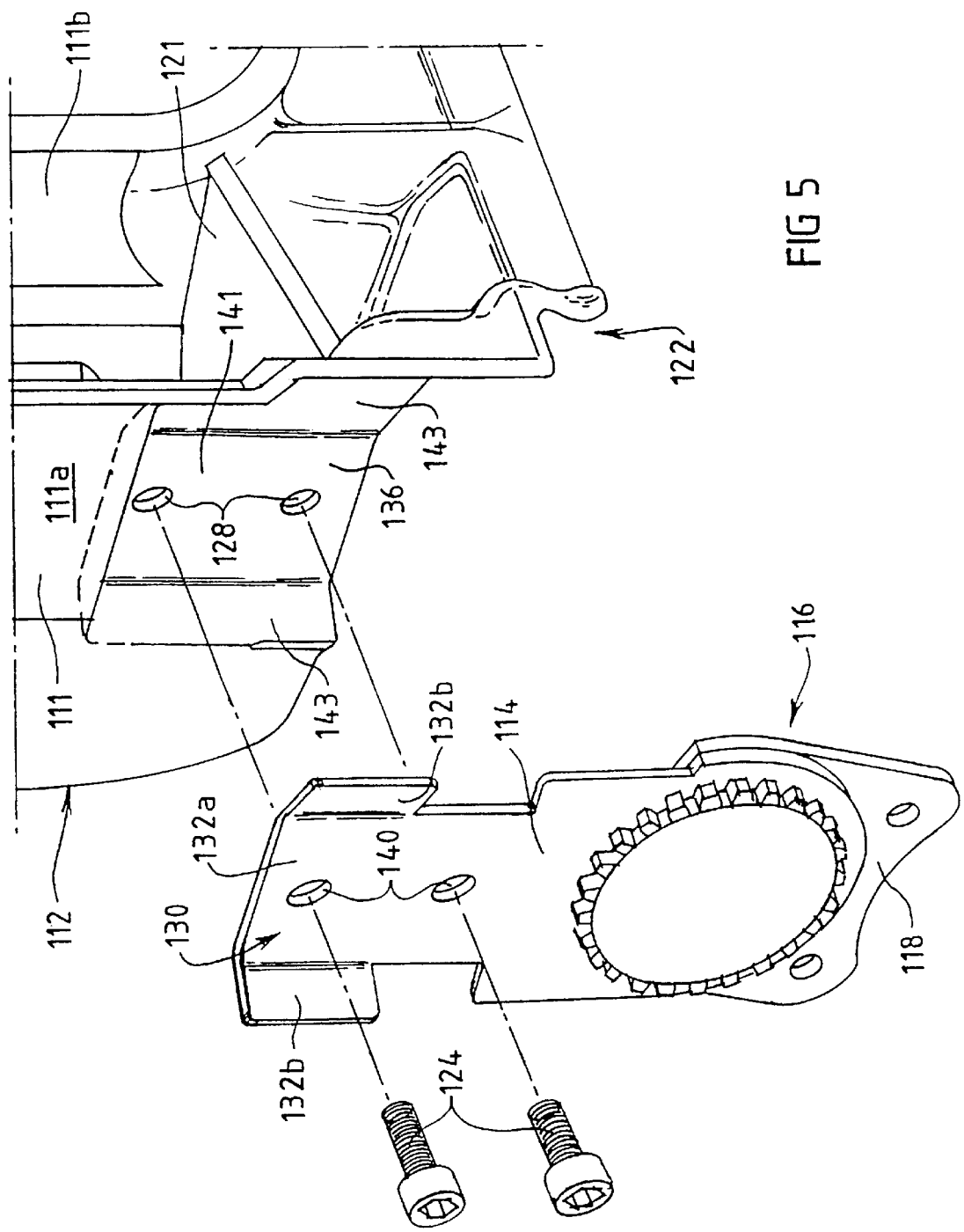
FIG. 5 is an exploded perspective view of a modified form of the FIG. 1 arrangement for one of the mounting members.

FIG. 5 illustrates a modified version of the arrangement 10 shown in FIGS. 1 to 4. For convenience, features shown in FIG. 5 that correspond to those of FIGS. 1 to 4 have the same reference numeral, plus 100.

The coupling 116 shown in FIG. 5 is generally the same as, and operates in the same manner, as the coupling 16 of FIGS. 1 to 4. However, the mounting member 114 includes a load dispersing member 130 which is shown as being integrally formed to the mounting member 114. The member 130 could however be attached to the mounting member 114 by other means, such as by suitable fasteners, although that would detract from the advantages of the overall arrangement e.g. cost, weight saving etc. The mounting member 114 and the 20 member 130 could be formed from the materials and by the methods identified earlier for the separate member 14 and the device 30.

In the arrangement of FIG. 5, each of the frame members 111 and 115 (not shown) includes a recess 136 in the outer surface of the outer walls 111a and 115a. The recess 136 of FIG. 5 is disposed perpendicular to the recess 36 of FIG. 2, although the arrangement could equally provide a recess perpendicular to that shown in FIG. 5, by rearranging the connection or formation of the load dispersing member 130 relative to the mounting member 114. The recess 136 has a central planar region 141, which is flanked on opposite sides by inclined surfaces 142 and 143. The included angle between the surfaces 142 and 143 is slightly less than the included angle between the wings 132b of the load dispersing member 130, for the reasons discussed in relation to the FIG. 2 arrangement.

It is preferred that the angle A between the body 132a and each wing 132b is no more than 135° and preferably approaching 90°. That arrangement ensures proper transmission of load from the seat backrest frame 12 to the wings 132b. This is particularly the case with horizontal loads. If the angle A between the body 132a and each wing 132b is greater than 135°, then the size, or surface area of the wings is required to be increased for proper transmission of load.

The coupling 116 is connected to the frame 112 by extending fasteners 124 through openings 140 in the central region 132a of the load dispersing member 130, which fasteners then extend through the openings 128 in the recess 136. The fasteners 124 may threadably engage nuts disposed on the obscured side of the wall 111a, which may be welded thereto, or other arrangements as earlier described may be employed. The bolts may also extend through openings in a boss, or plurality of bosses (one for each bolt) provided on the wall 111a, preferably on the obscured side of that wall. Fastening of the coupling 116 to the frame 112 in the manner shown in FIG. 5, results in the same benefits of load dispersion as the earlier described arrangement. The additional benefit of the FIG. 5 arrangement relates to a reduction of parts to be fitted, particularly if the member 114 and the load dispersion member 130 are integrally formed.

The connecting arrangement provided by the present invention is relatively simple. However, it also is found to be highly effective. The seat backrest frame is found to have a very significantly enhanced resistance to fracturing in both static and dynamic strength tests representing impact loads such as experienced in front and rear impact vehicle crash tests. Specifically, the arrangement has been found to perform satisfactorily in suitable sled tests which simulate vehicle crash tests. Moreover, this arrangement achieves this excellent level of performance without significant loss of the weight savings resulting from the backrest frame being cast from light alloy.

Finally, it is to be understood that various alterations, modifications and/or additions may be introduced into the constructions and arrangements of parts previously described without departing from the spirit or ambit of the invention.

What is claimed is:

1. A seat arrangement including a backrest frame and a base frame, said backrest frame being connectable, adjacent a lower extent of each of opposite sides thereof, to respective mounting means that facilitate pivotable mounting of the backrest frame to the base frame;

each said mounting means having associated therewith a respective load dispersing member and said backrest frame being connected to said mounting means by fasteners inserted laterally of the frame, through the mounting means, the frame and the respective load dispersing member;

said fasteners, on fastening, drawing each load dispersing member into a respective recess defined by the backrest frame, each said load dispersing member and respective recess having a complimentary form to define respective base surfaces through which the fasteners extend, and opposing side surfaces, whereby said fasteners, upon fastening said backrest frame to said mounting means, causes each said load dispersing member to be clamped in said respective recess, whereby respective adjacent side surfaces of said recess and said load dispersing member are urged into surface-to-surface contact and thereby disperse loads generated by the fastening over areas of said surface-to-surface contact.

2. A seat arrangement according to claim 1, said mounting means including a mounting member and a respective said load dispersing member attached thereto, said fasteners being inserted through said load dispersing member and said backrest frame.

3. A seat arrangement according to claim 2, said mounting member and said load dispersing member being integrally formed.

4. A seat arrangement according to claim 1, said mounting means including a mounting member and a separate respective said load dispersing member, said mounting member being located on an opposite side of said backrest frame to said load dispersing member and said fasteners being inserted through said mounting member, said backrest frame and said load dispersing member.

5. A seat arrangement according to claim 4, said load dispersing member being formed from steel plate by a pressing or stamping operation.

6. A seat arrangement according to claim 1, said side surfaces of each of said respective recess and said load dispersing member being disposed substantially parallel.

7. A seat arrangement according to claim 1, said side surfaces of said load dispersing member extending substantially perpendicular to said base surface thereof.

8. A seat arrangement according to claim 1, said side surfaces of each of said respective recess and said load dispersing member being disposed to diverge.

9. A seat arrangement according to claim 8, said side surfaces of each of said respective recess and said load dispersing member diverging at an angle measured between each said side surface and said base surface of between 90° and 135°.

10. A seat arrangement according to claim 1, said fasteners being selected from the group of threaded screws, bolts, or rivets.

11. A seat arrangement according to claim 1, said fasteners being spaced from each other in front to rear direction relative to said backrest frame when said frame is in an upright orientation.

12. A seat arrangement according to claim 1, said fasteners being spaced from each other in an upward direction relative to said backrest frame when said frame is in an upright orientation.

13. A seat arrangement according to claim 1, said base surface of said load dispersing member being formed with holes suitable for receiving fasteners therethrough, said holes being threaded.

14. A seat arrangement according to claim 13, said load dispersing member including threaded nuts welded over the opposite side of and coaxial with the holes to which the fasteners are inserted for threaded engagement by the fasteners.

15. A seat arrangement according to claim 1, said base surface of said load dispersing member having burst holes for engagement with self-threading fasteners.

16. A seat arrangement according to claim 1, wherein strengthening ribs extend between said side surfaces of said load dispersing member.

17. A seat arrangement according to claim 1, said load dispersing member being of solid form between said side surfaces.

18. A seat arrangement according to claim 1, wherein an included angle between said side surfaces of said load dispersing member is slightly in excess of an included angle between the complimentary side surfaces of said recess.

19. A seat arrangement according to claim 1, said recess being open at each end thereof.

20. A seat arrangement according to claim 1, said recess being closed at each end to enclose the load dispersing member around the periphery thereof, in the clamped condition.

21. A seat arrangement according to claim 1, said load dispersing member being closed across adjacent ends of said respective opposing side surfaces.

* * * * *